US009800519B2

(12) United States Patent
Zlati et al.

(10) Patent No.: US 9,800,519 B2
(45) Date of Patent: Oct. 24, 2017

(54) EQUITABLE SHARING OF SYSTEM RESOURCES IN WORKFLOW EXECUTION

(71) Applicant: Microsoft Technology Licensing, LLC, Redmond, WA (US)

(72) Inventors: Nicoleta Zlati, Kirkland, WA (US); Felix Man Toe Cho, Redmond, WA (US); Erik Jonas Kallstrom, Redmond, WA (US); Anirudh Garg, Sammamish, WA (US); Igor Sedukhin, Issaquah, WA (US); Manoj Nayar, Redmond, WA (US); Mohamed Enein, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 14/465,646

(22) Filed: Aug. 21, 2014

(65) Prior Publication Data
US 2016/0057076 A1 Feb. 25, 2016

(51) Int. Cl.
*G06F 15/173* (2006.01)
*H04L 12/911* (2013.01)
*H04L 29/08* (2006.01)
*G06F 9/48* (2006.01)
*G06F 9/50* (2006.01)
*G06F 12/00* (2006.01)

(52) U.S. Cl.
CPC ............ *H04L 47/783* (2013.01); *G06F 9/485* (2013.01); *G06F 9/5083* (2013.01); *H04L 29/08144* (2013.01)

(58) Field of Classification Search
CPC ..... H04L 47/783; G06F 9/5083; G06F 9/485; G06F 9/5077; G06F 9/4881; G06F 9/5016; G06F 9/5061; G06F 9/546; G06F 2209/504; G06F 9/45558; G06F 9/5011; G06F 2009/4557; G06F 9/505; G06F 9/5066; G06F 9/50; G06F 11/3442; G06F 11/3447; G06F 11/3457
USPC ................................. 709/203, 223–231, 250
See application file for complete search history.

(56) References Cited

U.S. PATENT DOCUMENTS 6,574,717 B1 6/2003 Ngai et al.
8,683,495 B1 3/2014 Moore et al.
(Continued)

FOREIGN PATENT DOCUMENTS

WO 9403855 A1 2/1994

OTHER PUBLICATIONS

"International Search Report and Written Opinion Issued in PCT Application No. PCT/US2015/045977", dated Nov. 25, 2015, 11 Pages.
Ananthanarayanan, et al., "True Elasticity in Multi-Tenant Data-Intensive Compute Clusters", In Proceedings of the Third ACM Symposium on Cloud Computing, Oct. 14, 2012, 10 pages.
"IBM Platform Dynamic Cluster", Retrieved on: Jun. 3, 2014 Available at: http://www-03.ibm.com/systems/platformcomputing/products/lsf/dynamiccluster.html.
(Continued)

*Primary Examiner* — Zarni Maung
(74) *Attorney, Agent, or Firm* — Workman Nydegger

(57) ABSTRACT

A method may be practiced in a distributed computing environment that provides computing resources to a plurality tenants. The method includes acts for allocating a limited set of system resources to the tenants. The method includes identifying a resource slice. The method further includes identifying an executing tenant workload. Checkpoint characteristics are identified for the executing tenant workload. Based on the checkpoint characteristics and the resource slice, a task eviction event is identified.

20 Claims, 3 Drawing Sheets

(56) References Cited

U.S. PATENT DOCUMENTS

| | | | |
|---|---|---|---|
| 2011/0145392 A1 | 6/2011 | Dawson et al. | |
| 2011/0153824 A1 | 6/2011 | Chikando et al. | |
| 2012/0110581 A1 | 5/2012 | Watson et al. | |
| 2012/0131591 A1 | 5/2012 | Moorthi et al. | |
| 2013/0139172 A1* | 5/2013 | An | G06F 9/5005 718/104 |
| 2013/0185735 A1* | 7/2013 | Farrell | G06F 9/542 719/318 |
| 2013/0254407 A1 | 9/2013 | Pijewski et al. | |
| 2014/0019981 A1 | 1/2014 | Boyer et al. | |
| 2014/0181833 A1* | 6/2014 | Bird | G06F 9/5016 718/105 |

OTHER PUBLICATIONS

Pastorelli, et al., "Practical Size-based Scheduling for MapReduce Workloads", In Proceedings of the Computing Research Repository, Jan. 2013 Available at: http://arxiv.org/pdf/1302.2749.pdf.

Cho, et al., "Natjam: Eviction Policies for Supporting Priorities and Deadlines in Mapreduce Clusters", In Proceedings of Computer Science Research and Tech Reports, Retrieved on: Jun. 3, 2014, 16 pages.

International Preliminary Report on Patentability issued in PCT Application No. PCT/US2015/045977 dated Dec. 13, 2016.

"Second Written Opinion Issued in PCT Application No. PCT/US2015/045977", dated Aug. 23, 2016, 8 Pages.

\* cited by examiner

EQUITABLE SHARING OF SYSTEM RESOURCES IN WORKFLOW EXECUTION

BACKGROUND

Background and Relevant Art

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Some cloud providers use a partitioned scale up approach to allow the service to scale for increased usage. The service implements a concept of scale units (finite set of resources) that support a known set of users. Capacity is added by adding additional scale units as required when user limits are hit for the existing scale units. User limit is defined as a given number of users who will be affinitized to a scale unit that will execute all of their workload requests.

The set of available resources within a scale unit is finite and fixed but the system has to be able to deal with varying workload loads requested by the affinitized users without compromising the end user service level agreement (SLA) in terms of workloads being guaranteed execution time. There are various ways to potentially solve the problem One way is to dynamically scale out or up. This approach requires just-in-time addition or removal of system resources based on current demand factors. Implementing such an approach to a live running service requires a whole set of dependent factors which are hard to implement and maintain, not to mention the buffer that would be needed in terms of capacity because of time considerations when elastically expanding or contracting.

Another solution would be to determine the workload duration based on the workflow analysis. The purpose would be to prevent the workloads exceeding a certain duration from running. This solution can be difficult to implement. For example, a workflow can contain single calls that are internally implemented as infinite loops which would be prevented from being called. Further, restricting the set of activities that the user is allowed to use in the workflows creates a bad user experience.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment that provides computing resources to a plurality tenants. The method includes acts for allocating a limited set of system resources to the tenants. The method includes identifying a resource slice. The method further includes identifying an executing tenant workload. Checkpoint characteristics are identified for the executing tenant workload. Based on the checkpoint characteristics and the resource slice, a task eviction event is identified.

Another embodiment includes a cloud service configured to fairly allocate a limited set of resources to tenants of the cloud service. The cloud service includes a scheduling service. The scheduling service is configured to receive workloads from tenants of the cloud service. The cloud service includes a plurality of workers coupled to the scheduling service. The workers are configured to receive workloads from the scheduling service. The workers are configured to execute workloads from tenants based on resource slices in conjunction with an evaluation of checkpointing of workloads, such that task eviction events are based on resource slices and workload checkpointing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Some embodiments illustrated herein implement guaranteed execution resource slices for workloads that can be persisted, evicted and later resumed from the last persisted state (i.e., workloads that are checkpointed) as a way to ensure equitable sharing of system resources. Various different resources could be sliced. For example, a time slice of one or more system resources could be implemented. Thus for example, the slices may be one or more of a timed amount of a processor, a timed amount of memory access, a timed amount storage access, a timed amount of network usage, or combinations thereof. Alternatively or additionally, the resource slice could be a number of commands (e.g. script activities). Alternatively or additionally, the resource slice could be a number of processor operations. Alternatively or additionally, the resource slice could be an amount of network resources, such as an amount of data transmitted on a network. Alternatively or additionally, the resource slice could be an amount of storage resources, such as an amount of I/O to and from storage devices. Alternatively or additionally, the resource slice could be sandbox execution environment resources. Alternatively or additionally, the resource slice could be an amount of memory resources. Etc. While a number of different resource slices could be used alone or in combination, the example below is illustrated in the context of time slices, but other resources slices could be substituted.

Figure 1:
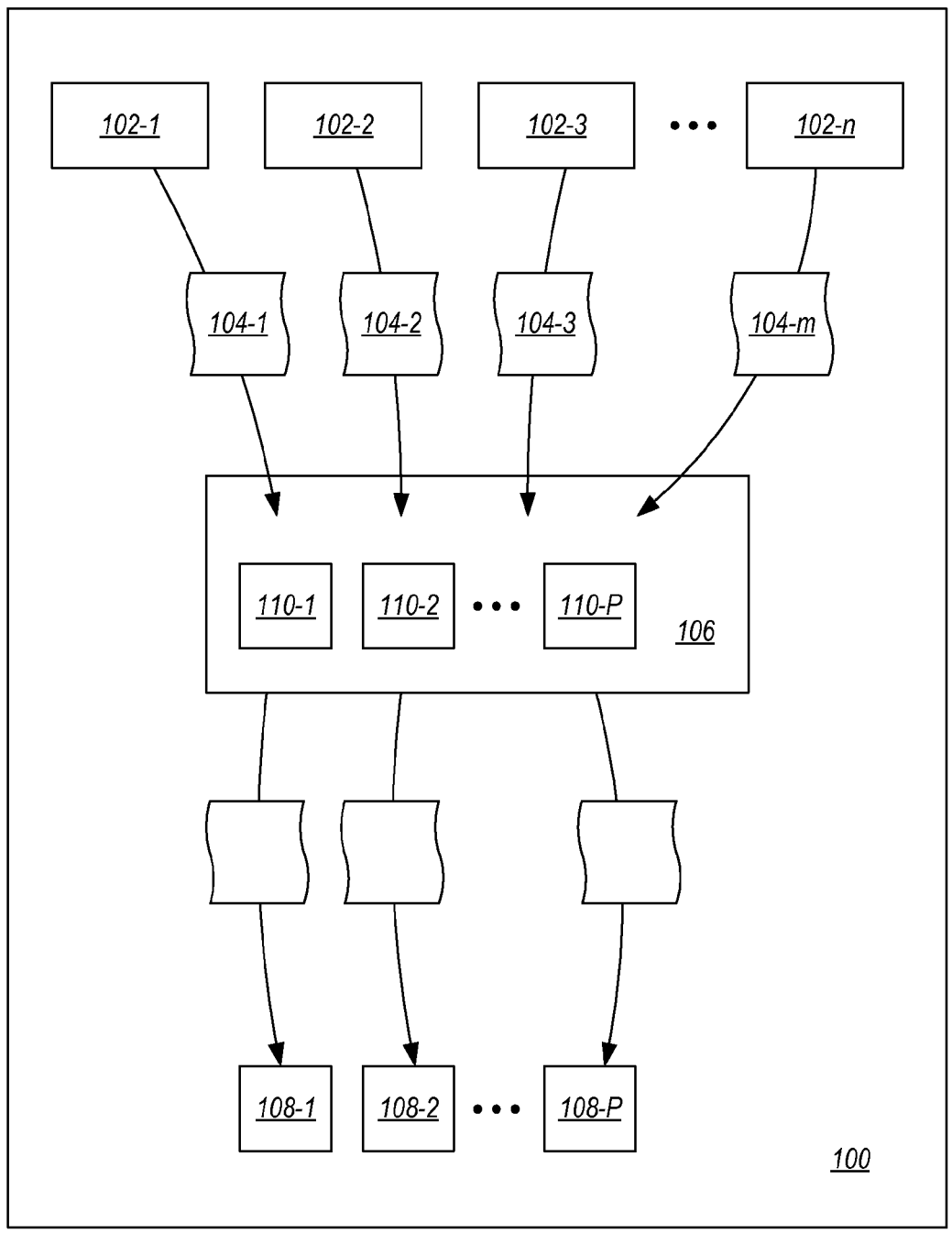
FIG. 1 illustrates a cloud based system configured to fairly allocated cloud resources.

Referring now to FIG. 1, an example is illustrated. In the example illustrated in FIG. 1, a cloud service 100 performs workloads for tenants 102-1, 102-2, 102-3 through 102-n of the cloud service 100. In the example, illustrated, the tenants send workloads 104-1, 104-2, 104-3 through 104-m to a scheduling service 106. The scheduling service 106 assigns the workloads to various workers 108-1, 108-2 through 108-p. The workers use certain resources of the cloud service 100.

To ensure that resources are shared fairly, workloads may be allowed to only use a given amount of resources before the workloads are evicted to give other workloads a chance to be performed. If the workloads are not completed at eviction, the workloads will be re-queued in the scheduling service 106 so that they can be given another turn to use cloud service resources.

In one typical example, resources will be time sliced. Thus, for example, a workload may be given a certain amount of time to complete, or to reach a checkpoint where work on the workload can be easily persisted such that the workload can be continued from the persisted state when the workload is allocated to a worker again. If the workload reaches the checkpoint and persists, then the workload can be evicted. This persists work that has been performed for the workload. If the workload exceeds the amount of time (or other resource slice allocation in other embodiments), then the workload is evicted even though the state cannot be persisted. This will result in the loss of work done on the workload. Thus, a workload may be assigned to a worker, such as worker 108-1. The worker will perform the workload until expiration of, in this example, a predetermined amount of time. If the time expires without the workload being persisted, then the workload will be evicted. If the workload reaches a checkpoint and is persisted, the workload will be evicted in this case as well.

Note that fairness does not necessarily mean that resources are evenly divided. Fairness may take into account several different factors that result in some tenants being provided a greater share of resources than other tenants. For example, a tenant that has paid a premium for a higher service level than other tenants may be allocated a greater share of resources embodies as a greater resource slice. Additionally, as will be illustrated in detail below, the cloud service 100 may provide, as an incentive, more flexibility for using resources when workloads comply with certain standards.

In particular, embodiments may incentivize checkpointing. Tenants who checkpoint their workloads in a certain way may be given some flexibility in the limits of a resource slice. Thus, for example, some embodiments may take proximity to checkpoints into account as part of the heuristic used to determine when to evict the workload. Tenants can structure checkpointing in their workloads to ensure a proscribed proximity to have their workloads given favorable treatment.

The following illustrates an example where the resource slice is a time slice of a processor. However, it should be appreciated, as discussed above, that other resource slices can be alternatively or additionally used. Thus, the following example, should not be construed as limiting the scope of resource slices to only time slices.

Some embodiments may be implemented using the Azure Automation Service workloads management available from Microsoft Corporation of Redmond Wash. However, embodiments can be used by virtually any multi-tenant system that has to provide an equitable sharing of system resources, that runs workloads of various duration (or other resource delineation), that support runtime state persistence.

In the illustrated example, workload requests (e.g. requests 104-1 through 104-m) coming from the tenants are placed in one of the workers' queues (e.g. queues 110-1, 110-2 through 110-p), from where they are picked up by the workers 108-1 through 108-p based on the system resource availability. Each worker is responsible for processing a single queue.

When the workload is loaded in memory, the time is recorded. While running, the workload can be persisted multiple times. When the workload persists is decided by the workflow author. Depending on when the execution time slice expires and when the workload has been last persisted, the workload is evicted. Various eviction rules may be implemented. Some specific examples are illustrated.

Figure 2:
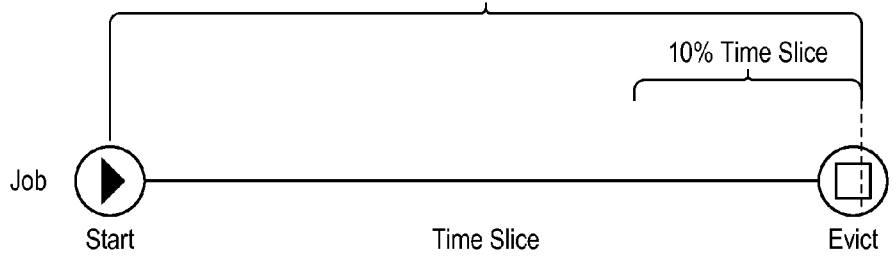
FIG. 2 illustrates an eviction event occurring when a time slice expires.
Figure 3:
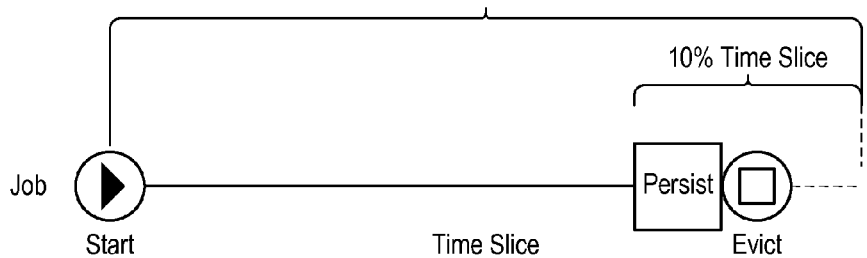
FIG. 3 illustrates an eviction event occurring in a predetermined portion of a time slice.

For example, with reference to FIG. 2, workloads that don't have any checkpoint in the last 10% (or some other selected percentage or portion) of the execution time slice are evicted when the execution time slice expires. With reference to FIG. 3, the workloads that have checkpoints in the last 10% (or some other selected percentage or portion) of the execution time slice are evicted soon after they persist. This behavior leads to a better customer experience, because when reactivated the workloads continue their execution from a checkpoint.

Figure 4:
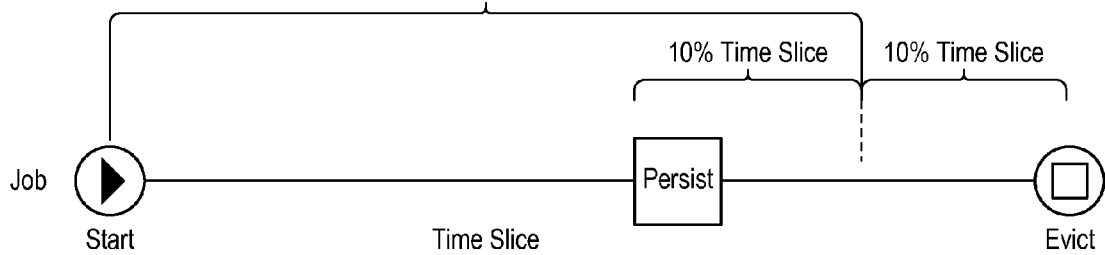
FIG. 4 illustrates a time slice being extended based on checkpointing existing in a predetermined portion of the time slice.
Figure 5:
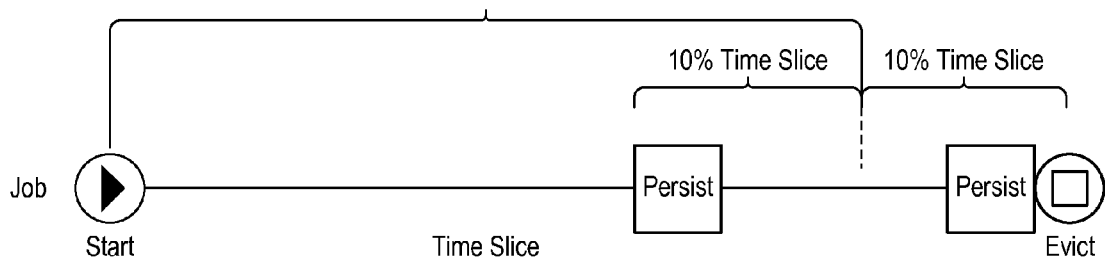
FIG. 5 illustrates a time slice being extended based on checkpointing existing in a predetermined portion of the time slice.

In one variation, embodiments can incentivize checkpointing behavior by "rewarding" workloads with frequent checkpoints by allowing them to run up to 10% (or some other selected percentage or portion) over the time slice. As illustrated in FIGS. 4 and 5, the workloads that have checkpoints in the last 10% (or some other selected percentage or portion) of the time slice are allowed to run 10% (or some other selected percentage or portion) more than the time slice or until they are evicted (see FIG. 4) or persist (see FIG. 5).

The evicted workload's runtime status is not changed but a description that indicates that workload is no longer in memory is attached to the workload. For example the workloads that are "Running" become "Running, Waiting for resources".

Embodiments may accommodate assignment of the evicted workload to a different worker as a way to even the workload distribution between multiple workers. Embodiment may take into account immediate history of resource utilization on workers when making workload placement decisions. The evicted workloads are placed at the back of one of the available worker queues (e.g., one of 110-1 through 110-p). The available queue can be selected randomly or based on the worker resources availability.

When the newly assigned worker (e.g., one of 108-1 through 108-p) picks up the workload again from the queue, the workload is reactivated from the last available checkpoint.

There are some best practices around checkpoints in a workflow that facilitate this execution model. The user should ensure that the workload is persisted frequently and that the execution is idempotent (i.e., if the workload runs multiple times from a checkpoint the results are the same). If the workload does not contain checkpoints or does not manage to progress from an existing checkpoint after a number of trials then embodiments can mark it as "Failed" and stop trying to reactivate it. A tenant can also be notified of the failure. In some embodiments, embodiments may notify the tenant that the workload will more likely succeed if it is checkpointed or has more frequent checkpointing.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
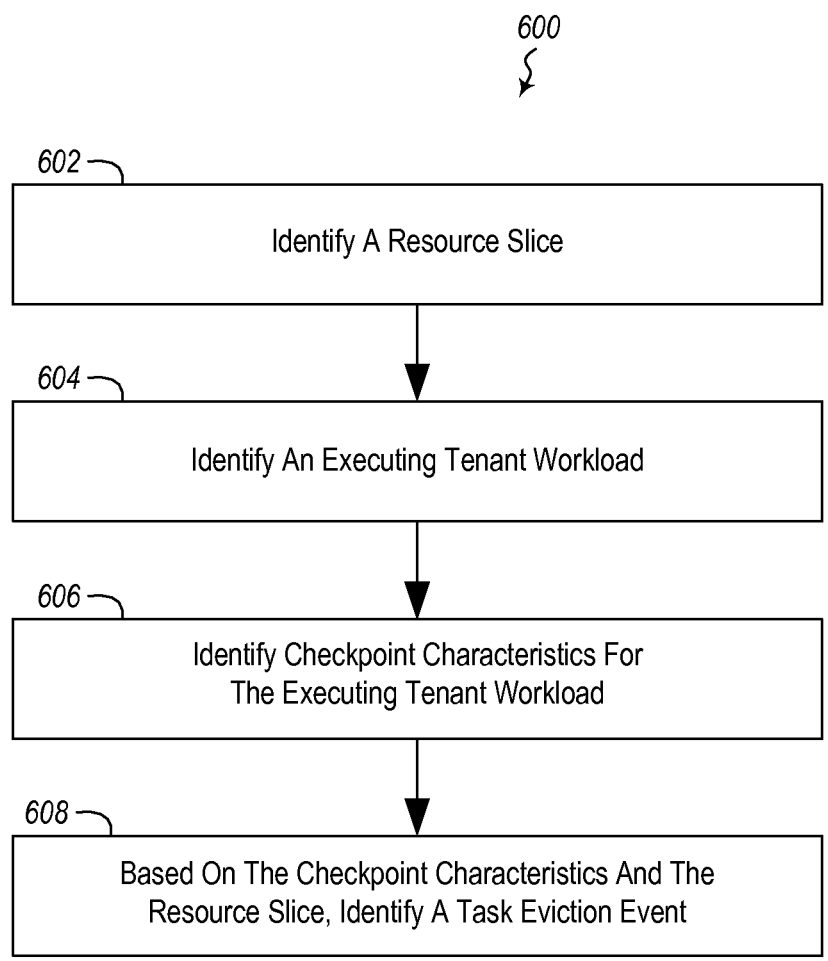
FIG. 6 illustrates a method for providing resources to a plurality of tenants of a distributed computing systems.

Referring now to FIG. 6, a method 600 is illustrated. The method 600 may be practiced in a distributed computing environment that provides computing resources to a plurality tenants. The method includes acts for allocating a limited set of system resources to the tenants (in a fair manner). The method includes identifying a resource slice (act 602). For example, the resource slice may be one or more of: a time slice, a number of commands (e.g. script activities), processor resources, network resources, storage resources, sandbox execution environment resources, memory usage, I/Os, etc.

In some embodiments, the resource slice is dynamically configurable. Thus, for example, the resource slice can change in magnitude depending on a number of different factors. In one example, the resource slice may be dynamically reconfigurable based on manual settings. Thus, an administrator at a cloud service could manually set the size of a resource slice. Alternatively or additionally, the resource slice may be dynamically configurable based on load. Thus for example, if there is low demand for resources, resource slices could be larger than where there is high demand for resources. Alternatively or additionally, resources slices could be dynamically configured based on time of day, time of year, seasons, etc. Thus, for example, a cloud service that handled e-commerce tenants may have smaller resource slice allocations during a holiday shopping season than during other less demanding seasons of the year.

The method 600 further includes identifying an executing tenant workload (act 604). For example, embodiments may identify a workload executing on a worker (such as one of workers 108-1 through 108-p).

The method 600 further includes identifying checkpoint characteristics for the executing tenant workload (act 606). The workflow will identify checkpoints in the workflow which can be identified by the cloud service. This may include identifying if checkpoints exist in a workflow, where the checkpoints exist in a workflow, how often or consistent checkpointing is performed for the workflow, etc.

Based on the checkpoint characteristics and the resource slice, the method 600 further includes identifying a task eviction event (act 608). The location of the checkpoints may affect how and when the task eviction event occurs. For example, in some embodiments, identifying a task eviction event comprises evicting a tenant workload prior to the expiration of the resource slice when checkpointing occurs prior to the expiration of the resource slice. An example of this is illustrated in FIG. 3 above.

Alternatively or additionally, identifying a task eviction event comprises evicting a tenant workload within some predetermined extension of the expiration of the resource slice when checkpointing occurs within the predetermined extension of the expiration of the resource slice. An example of this is illustrated above in FIG. 5.

The method 600 may further include determining that a tenant workload continues to be evicted without checkpointing a predetermined number of times. As a result, the method 600 includes performing a corrective function. Thus for example, as illustrated in FIG. 2, a workload may be evicted before it can be checkpointed. An evicted workload may be rescheduled and retried one or more additional times.

Once the workload has been retried a predetermined number of times, some other corrective action will be performed. This can be a corrective action on the workload. For example, the corrective action may include terminating the workload to prevent future retries of the workload. Alternatively or additionally, the corrective action may include may include extending the resource slice to grant some additional resources to perform the workload. In some embodiments, this may be performed by premium purchase, automatically charging additional amounts to a tenant, etc. Alternatively or additionally, this may be a corrective action performed with respect to a tenant. For example, a tenant may be notified that the workload cannot complete due to insufficient checkpointing. In some extreme cases, the tenant may be banned from the cloud service or put in some probationary state for not complying with checkpointing requirements.

The method 600 may further include identify that there is no load on a workload queue and as a result, not performing some event even though the workload exceeded resource slice constraints that would have ordinarily caused the workload to be evicted. Thus for example, if there are no other workloads pending in a workload queue and a workload should have been evicted, additional resources can be granted to allow the workload to complete.

The method 600 may further include notifying a user of constructive treatment (such as extending the resource slice by some amount) of their workload based on the user's use of checkpoints. For example, a tenant may be notified in a service report provided on a periodic basis regarding the amount of constructive treatment their workloads have been granted based on the tenant's use of checkpointing. Alternatively or additionally, each time constructive treatment is granted, an alert may be issued to the tenant. Other methods may be alternatively or additionally used to alert the user to favorable treatment.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for efficiently allocating a limited set of resources of a computer system to perform work on one or more workloads, the method being performed by one or more processors of the computer system, the method comprising:

after identifying the computer system's resources, slicing the computer system's resources to generate one or more resource slices, the one or more resource slices being usable to complete assigned workloads;

receiving a workload at the computer system;

assigning the workload to a resource slice for execution, wherein a queue is associated with the resource slice, and wherein the workload is placed in the queue while waiting to be executed;

after determining that the workload includes one or more checkpoints, determining a proximity between at least one of the workload's checkpoints and an end portion of the resource slice;

based on (1) the proximity between the at least one of the workload's checkpoints and the end portion of the resource slice and (2) one or more characteristics of the resource slice, determining an eviction time to evict the workload from the resource slice;

after determining that the proximity between the at least one of the workload's checkpoints and the end portion of the resource slice satisfies a proximity requirement, causing the resource slice to execute the workload beyond the eviction time; and after the eviction time has elapsed, causing the workload to be evicted from the resource slice.

2. The method of claim 1, wherein the one or more resource slices are one or more of a timed amount of processor usage.

3. The method of claim 1, wherein causing the workload to be evicted from the resource slice comprises:

evicting the workload from the resource slice within a predetermined extension beyond the eviction time.

4. The method of claim 1, wherein the resource slice comprises one or more of: a time slice, a number of commands, an amount of processor resources, an amount of network resources, an amount of storage resources, an amount of sandbox execution environment resources, an amount of memory, or an amount of I/O.

5. The method of claim 1, wherein the resource slice is dynamically configurable.

6. The method of claim 1, wherein the method further comprises:

determining that the workload has previously been evicted from the resource slice without being fully executed; and in response to the determination that the workload has not been fully executed, performing a corrective function.

7. The method of claim 6, wherein the corrective function comprises terminating the workload.

8. The method of claim 6, wherein the corrective function comprises extending the resource slice.

9. The method of claim 1, wherein the method further comprises:
identifying that a different queue of a different resource slice is empty; and
in response to identifying that the different resource slice does not have any queued workloads, extending the eviction time.

10. The method of claim 1, wherein the method further comprises:
notifying a user of constructive treatment of the workload based on the plurality of checkpoints.

11. One or more computer-readable hardware storage devices having stored thereon computer-executable instructions, the computer-executable instructions being executable by one or more processors of a computer system to cause the computer system to efficiently allocate a limited set of resources of the computer system to perform work on one or more workloads by causing the computer system to:
after identifying the computer system's resources, slice the computer system's resources to generate one or resource slices, the one or more resource slices being usable to complete assigned workloads;
receive a workload at the computer system;
assign the workload to a resource slice for execution, wherein a queue is associated with the resource slice, and wherein the workload is placed in the queue while waiting to be executed;
after determining that the workload includes one or more checkpoints, determine a proximity between at least one of the workload's checkpoints and an end portion of the resource slice;
based on (1) the proximity between the at least one of the workload's checkpoints and the end portion of the resource slice and (2) one or more characteristics of the resource slice, determine an eviction time to evict the workload from the resource slice;
after determining that the proximity between the at least one of the workload's checkpoints and the end portion of the resource slice satisfies a proximity requirement, cause the resource slice to execute the workload beyond the eviction time; and
after the eviction time has elapsed, cause the workload to be evicted from the resource slice.

12. The computer readable media of claim 11, wherein execution of the computer-executable instructions further causes the computer system to:
identify that a different queue of a different resource slice is empty; and
extend the eviction time.

13. The computer readable media of claim 11, wherein execution of the computer-executable instructions further causes the computer system to extend the resource slice.

14. The computer readable media of claim 11, wherein execution of the computer-executable instructions further causes the computer system to:
terminate the workload when a predetermined number of task evictions are performed.

15. A computer system comprising:
one or more processors; and
one or more computer-readable hardware storage devices having stored thereon computer-executable instructions, the computer-executable instructions being executable by the one or more processors to cause the computer system to efficiently allocate resources of the computer system to perform work on one or more workloads by causing the computer system to:
after identifying the computer system's resource, slices the computer system's resources to generate one or more resource slices, the one or more resource slices being usable to complete assigned workloads;
receive a workload the computer system;
assign the workload to a resource slice for execution, wherein a queue is associated with the resource slice, and wherein the workload is placed in the queue while waiting to be executed;
after determining that the workload includes one or more checkpoints, determine a proximity between at least one of the workload's checkpoints and an end portion of the resource slice;
based at least partially on the proximity between the at least one of the workload's checkpoints and the end portion of the resource slice, determine an eviction time to evict the workload from the resource slice;
after determining that the proximity between the at least one of the workload's checkpoints and the end portion of the resource slice satisfies a proximity requirement, cause the resource slice to execute the workload beyond the eviction time; and
after the eviction time has elapsed, cause the workload to be evicted from the resource slice.

16. The computer system of claim 15, wherein the eviction time is extendable upon payment of a premium.

17. The computer system of claim 15, wherein execution of the computer-executable instructions further causes the computer system to:
determine where each of the one or more checkpoints is located in a workflow of the workload.

18. The computer system of claim 15, wherein execution of the computer-executable instructions further causes the computer system to:
determine whether the workload has failed to be fully executed by the resource slice; and
upon determining that the workload has failed to be fully executed, provide a notification that the workload needs additional checkpoints.

19. The computer system of claim 15, wherein causing the resource slice to execute the workload comprises:
persisting the workload to memory for a first time when a first checkpoint is reached; and
after persisting the workload to memory for the first time, causing the resource slice to continue to execute the workload.

20. The computer system of claim 19, wherein causing the resource slice to execute the workload further comprises:
persisting the workload to memory for a second time when a second checkpoint is reached, and
after persisting the workload to memory for the second time, causing the resource slice to continue to execute the workload.

* * * * *